Jan. 16, 1962 H. C. HANSEN 3,016,966
OMNIDIRECTIONAL DRIVE SYSTEM FOR LAND VEHICLES
Filed Oct. 12, 1960 9 Sheets-Sheet 1

INVENTOR
Howard C. Hansen
BY Dos J. Hatfield
ATTORNEY

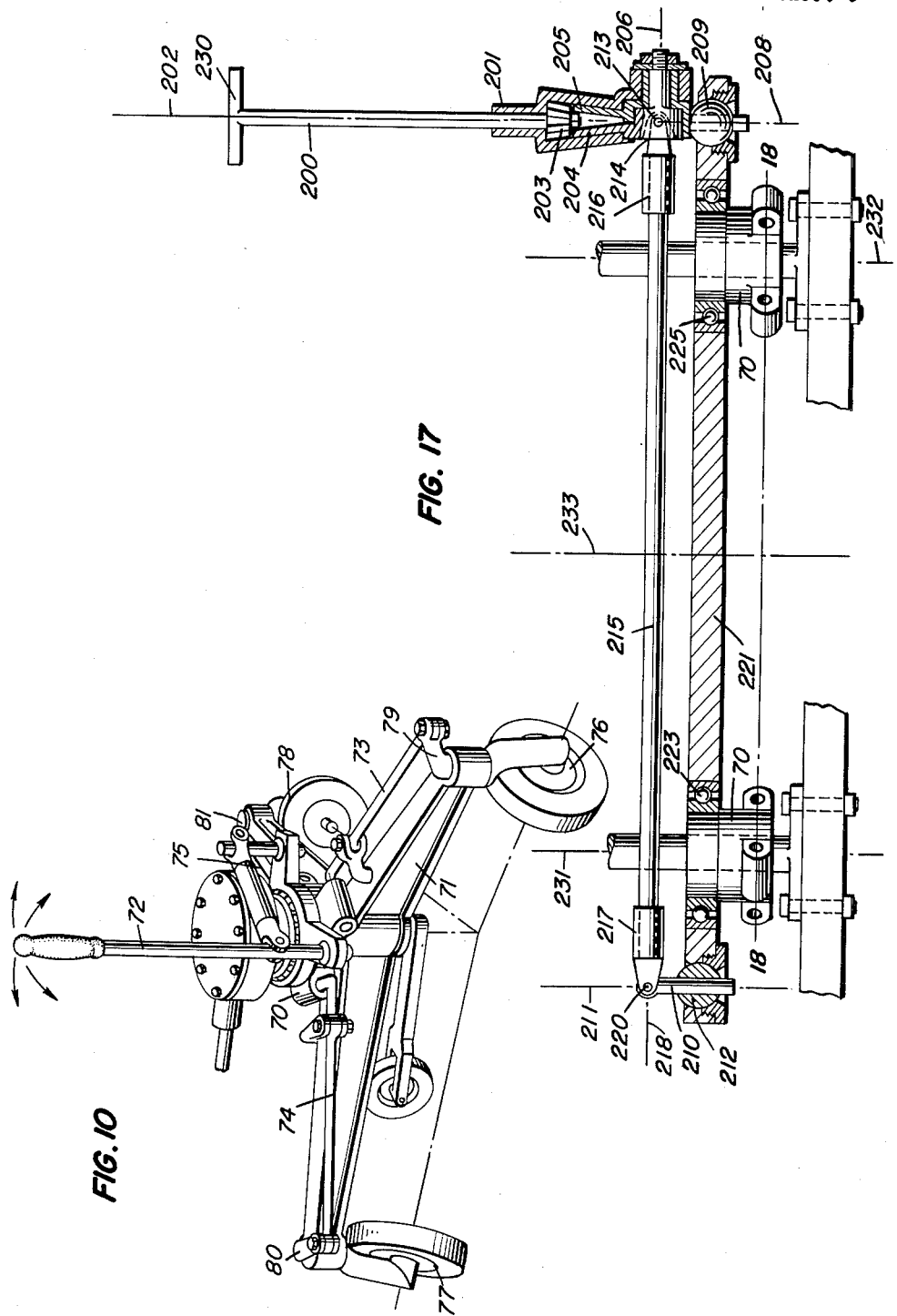

Jan. 16, 1962  H. C. HANSEN  3,016,966
OMNIDIRECTIONAL DRIVE SYSTEM FOR LAND VEHICLES
Filed Oct. 12, 1960  9 Sheets-Sheet 7
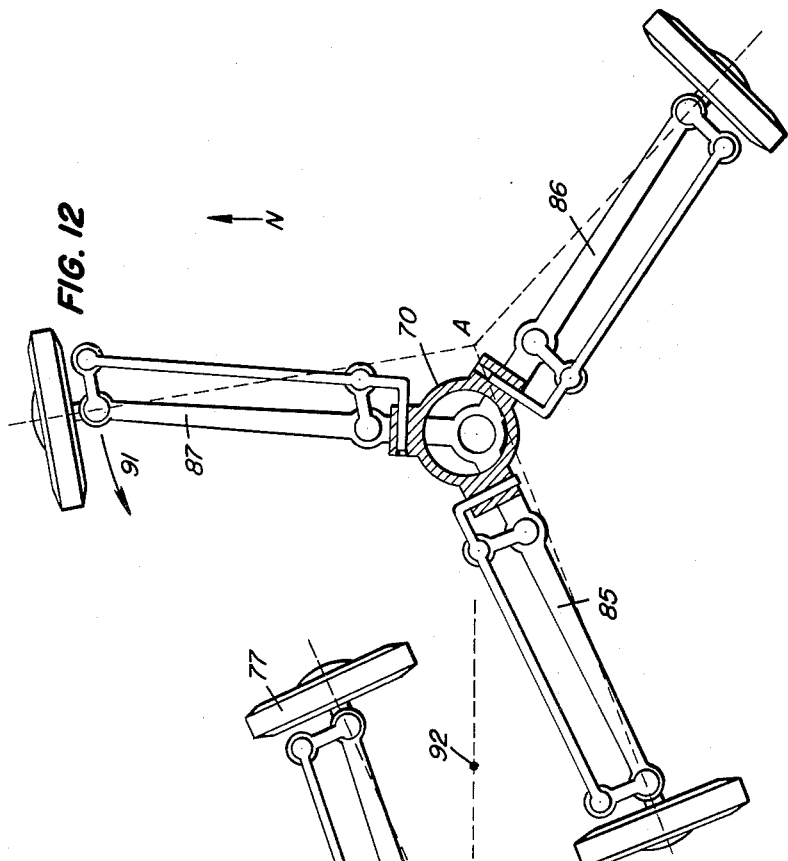
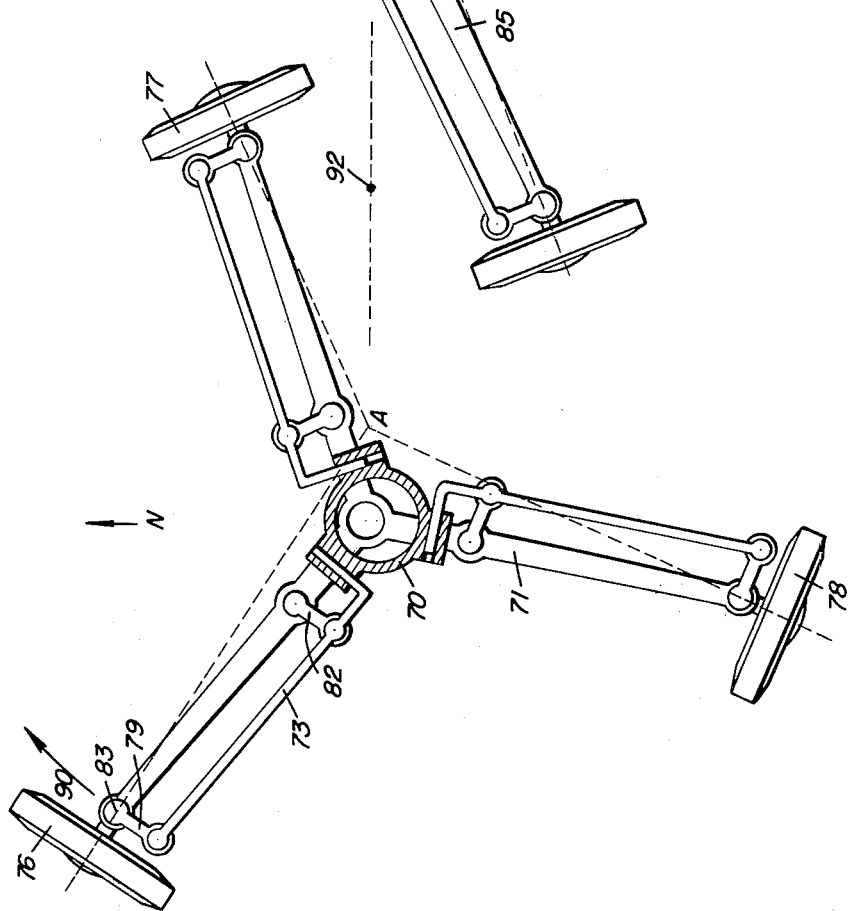

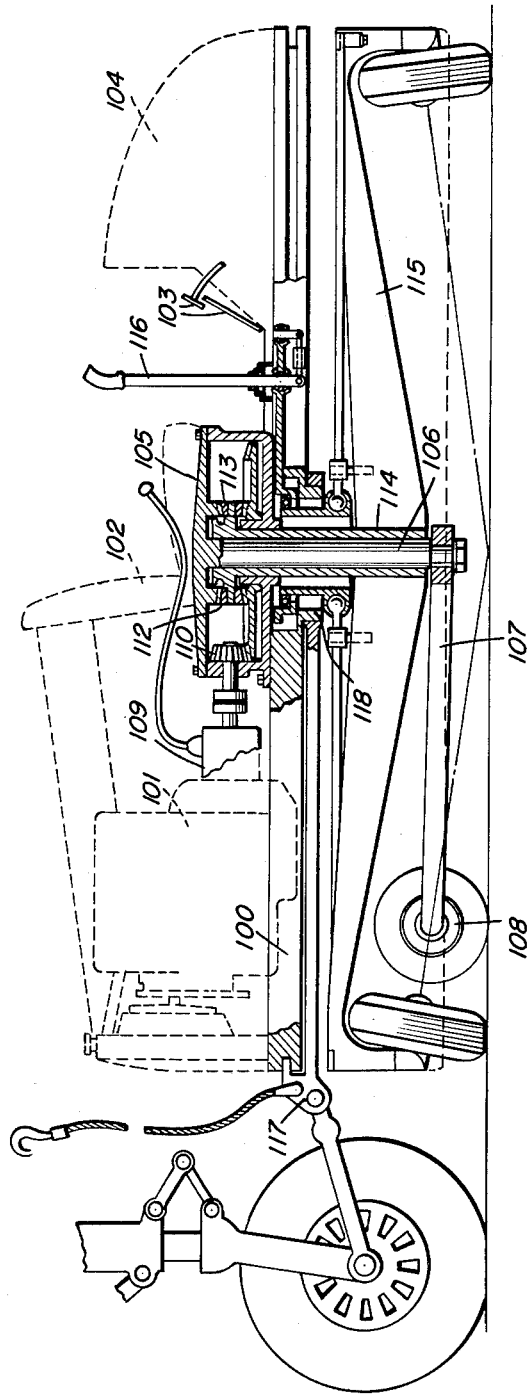

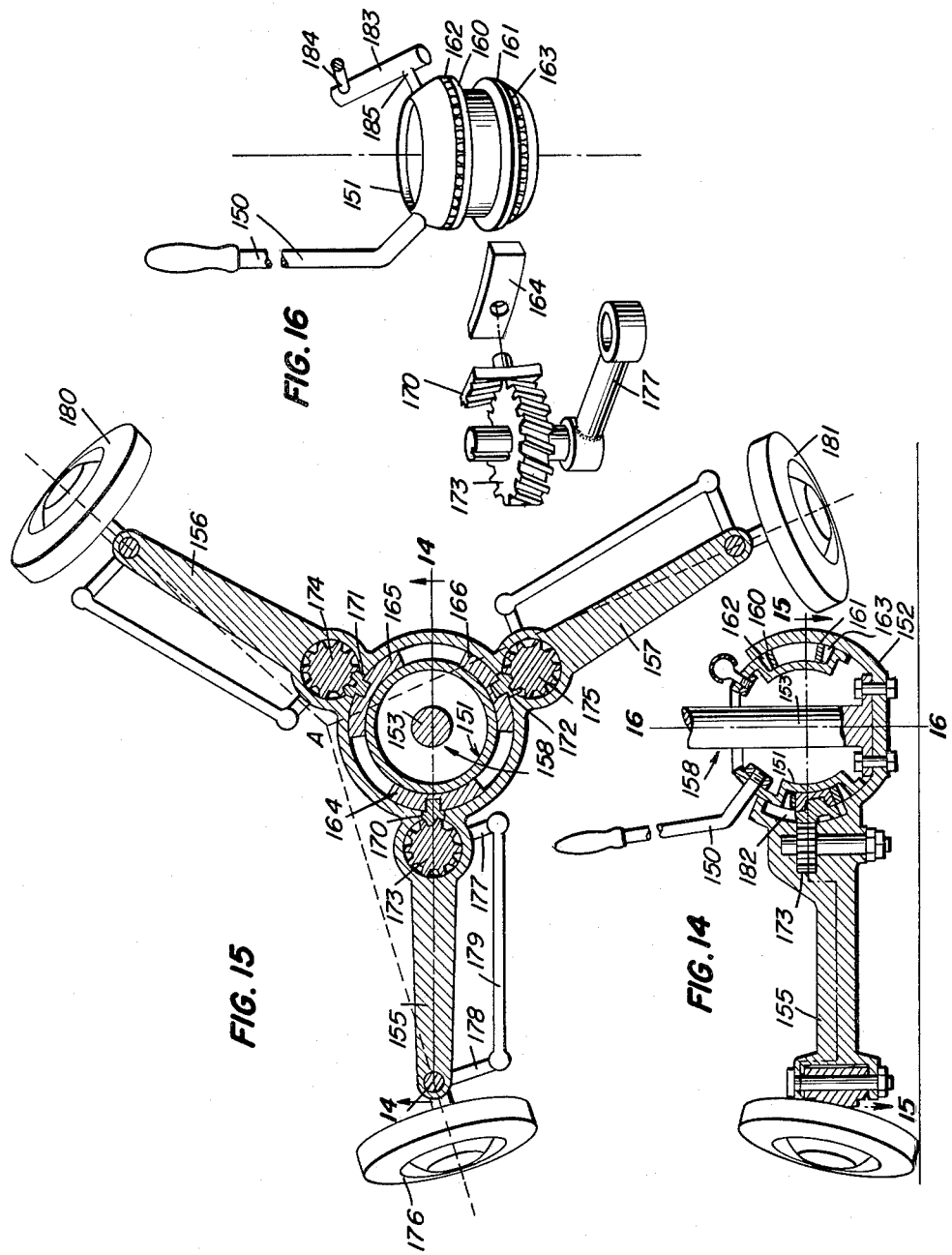

United States Patent Office 3,016,966
Patented Jan. 16, 1962

3,016,966
OMNIDIRECTIONAL DRIVE SYSTEM FOR
LAND VEHICLES
Howard Clair Hansen, 507 Illinois Ave. NW.,
Huron, S. Dak.
Filed Oct. 12, 1960, Ser. No. 62,189
28 Claims. (Cl. 180—26)

The present invention relates to land vehicles and more particularly to self-propelled land vehicles.

Self-propelled land vehicles are, of course, well known. Many such vehices are particularly intended for use as tractors or prime-movers. A very important requirement of tractor or truck vehicles is that they be as maneuverable as possible. It is also important that the application of driving power and the consequent production of tractive effort be as smooth and controlled as possible in order that maximum tractive effort may be available with an efficient utilization of power. When the tractor vehicle is to be employed for towing large aircraft or is to be used as a forklift truck, maneuverability is of prime importance.

It is a principal object of the present invention to provide an improved land vehicle having a novel omnidirectional drive system which enables the vehicle to be completely maneuverable to move or translate in any direction over the ground from a standing start.

It is another very important object of the present invention to provide a land vehicle having a novel drive system enabling solely by means of direct mechanical linkage the application of power and the production of tractive effort to be continuously variable from minimum to maximum limits of mechanical advantage.

Another object of this invention is to provide a land vehicle which may be supported on many wheels in order to achieve high load-bearing capacity and great tractive capability but in which great simplicity of construction is achieved in a novel drive system in which all wheels transmit tractive propelling power yet are free-running and unpowered in the conventional sense.

Another important object of the invention is to provide an improved land vehicle whose orientation, direction of travel, and power and speed may be either simultaneously or independently controllable by manipulation of a single control column or level.

Yet another important object of the invention is to provide a land vehicle that is completely maneuverable and controllable by the use of a single steering and power control column movable from a central position to any intended direction of movement of the vehicle and wherein the degree of movement of the control column from the central position in the intended direction controls the speed and the mechanical advantage of the tractive effort of the vehicle to increase the speed as the column is moved further.

Another object of this invention is to provide a land vehicle having a novel drive system the control lever of which may be manipulated with ease without necessity of aid from hydraulic power steering systems such as are frequently employed in conventional vehicles for the purpose of overcoming heavy control pressures.

Still another object of this invention is to provide an improved land vehicle that is completely maneuverable and highly controllable to be particularly well suited for use as an air port tractor or as a forklift truck or the like.

Yet another highly significant object of this invention is to provide a land vehicle which has no need for friction brakes in that the novel drive system of the invention inherently provides complete braking control over the vehicle.

In accordance with the invention, a vehicle main frame supporting the power source, driver's seat and controls is itself supported on at least one subframe that is rotatable beneath the main frame. One or more wheels supporting the vehicle are mounted on the periphery of the subframe. The power source may be connected to rotate the subframe and so long as the plane of rotation of each of the subframe wheels is maintained in tangential alignment with the rotation of the subframe, that is, so long as the axes of the wheel axles are radial with respect to the center of rotation of the subframe, the wheels will roll in a circular path on the ground and the subframe and the main frame will not translate in relation to the ground. The subframe wheels rotate on short shafts and are provided with kingpins and steering arms which are connected to a single control lever or column attached to the main frame of the vehicle. The control column is universally mounted and may be tilted in any direction and, so long as the control column bears a prependicular relationship to the plane of rotation of the subframe, the wheels are constrained to roll in a circular path on the ground as described above. When the control column is tilted in any direction away from the above-described perpendicular relationship, suitable linkage connecting the control column to the steering arms of the subframe wheesl causes the rotation of the subframe to vary the steering angles of the subframe wheels in sinusoidal fashion, thereby causing the subframe and the main frame to translate with respect to the ground. The interconnecting linkage is such as to cause the period of the sinusoidal variation of the steering angle of each wheel to be equal to the period of one revolution of the subframe, and such as to cause the phase-relationship between the rotation of the subframe and the steering angle variations to be determined by the direction in which the control column is tilted, and such as to cause the magnitude of the steering angle variations to be determined by the degree to which the control column is tilted. The arrangement is such, therefore, that the direction of movement of the vehicle is determined by the direction in which the control column is tilted, while the speed of the vehicle movement and, inversely, the mechanical advantage of the tractive effort are determined by the degree to which the control column is tilted. Thus complete maneuverability and controllability of the land vehicle are obtained with the use of a single control column. One or more trailing wheels may be fixed to the vehicle main frame to establish a heading for the main frame and to prevent contrarotation of the vehicle main frame, or a second subframe may be utilized to provide a means for controlling the heading of the main frame of the vehicle relative to the direction of movement of the vehicle over the ground.

Further objects, features and the attendant advantages of the invention will be apparent with reference to the following specification and drawings in which:

FIG. 10 is a perspective view similar to FIG. 4 but showing a slightly modified form of control linkage;

FIG. 11 is a diagrammatic plan view of the subframe shown in FIG. 10 as arranged for clockwise rotation and depicting translation over the ground in one direction; while FIG. 12 is a view similar to FIG. 11 but arranged for counterclockwise rotation and depicting translation over the ground in the opposite direction to that of FIG. 11;

FIG. 13 is a side view partly in elevation of a complete tractor vehicle adaptable for towing aircraft or the like;

FIG. 14 is a fragmentary section on the line 14—14 of FIG. 15 to show another modified form of control for the vehicle subframe;

FIG. 15 is a section view on the line 15—15 of FIG. 14 of a three-wheeled subframe embodying the modified geared control arrangement shown in FIG. 14;

FIG. 16 is an exploded view of the control parts as seen on the line 16—16 of FIG. 14; and FIG. 17 is a detailed fragmentary view partly in section of a single control system for a vehicle having a main frame supported on a pair of three-wheeled revolving subframes.

Figure 1:
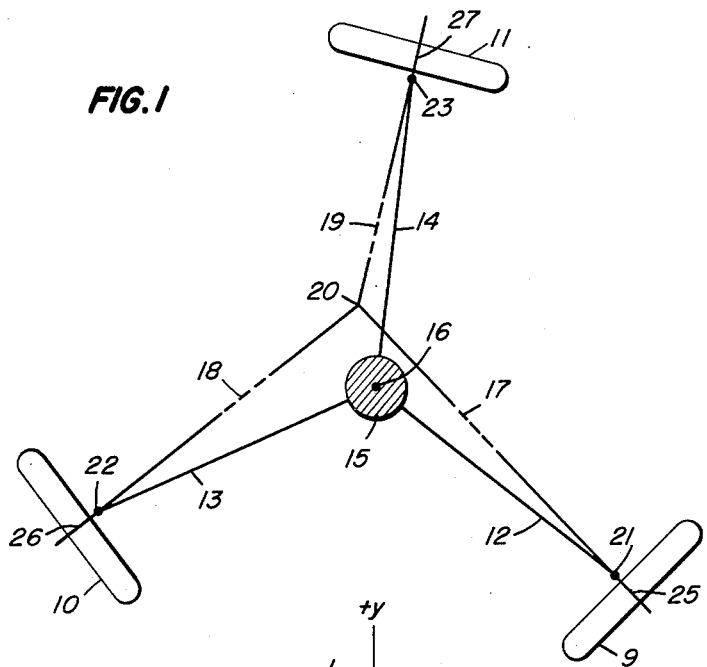
FIG. 1 is a diagrammatic plan view of the vehicle subframe of the invention as designed for three subframe wheels.

Reference will now be made to FIG. 1 of the drawings which is a diagrammatic illustration of a simple form of a vehicle of the invention omitting the vehicle frame and showing only the principal subframe elements to enable vehicle translation over a ground surface or the like. All elements shown lie in and are constrained to move only in the plane of the paper upon which drawn, except that wheels 9, 10 and 11 are in rolling contact with the ground which is parallel to and beneath the plane of the paper. Radial wheel support arms 12, 13 and 14 are equally spaced about and rigidly attached to hub 15 which is free to rotate about point 16 on the vehicle frame (not shown). Links 17, 18 and 19 are attached to and free to pivot independently about their point of intersection 20. Link 17 is attached to and free to pivot about point 21 on radial arm 12. Links 18 and 19 are similarly attached to their respective pivot points 22 and 23 on radial arms 13 and 14. The extension 25 of link 17, the extension 26 of link 18, and the extension 27 of link 19 are the respective axes of rotation or axles for wheels 9, 10 and 11. The portions of links 17, 18 and 19 between point 20 and their respective axle portions 25, 26 and 27 are of variable length as will be later described in detail and as schematically indicated by the broken lines.

Now assume that the position of point 20 is held fixed as shown with respect to point 16. If hub 15 is driven to rotate clockwise about point 16, wheels 9, 10 and 11 will be carried in a circular path about point 16. As the rotation proceeds, the lengths of links 17, 18 and 19 and the magnitudes of the steering angles for wheel axles 25, 26 and 27 pivoting respectively at 21, 22 and 23 will vary in sinusoidal fashion. If point 20 were held fixed in a position concurrent with point 16, the planes of rotation of the three wheels would remain tangent to their circular path about point 16, and their resultant path over the ground would also be circular, so that the vehicle would not translate in relation to the ground. The direction the vehicle will translate over the ground and the speed with which it will translate are respectively determined by the geographic direction and the distance of point 20 from point 16.

It may be proved analytically that if point 20 is held fixed at some position which is displaced from point 16, as shown:

(a) The rotating system of the vehicle will translate over the ground in the geographic direction which lies 90 degrees to the right of the direction from point 20 to point 16.

(b) The rate of vehicle translation will be directly proportional to the distance between points 20 and 16.

Figure 2:
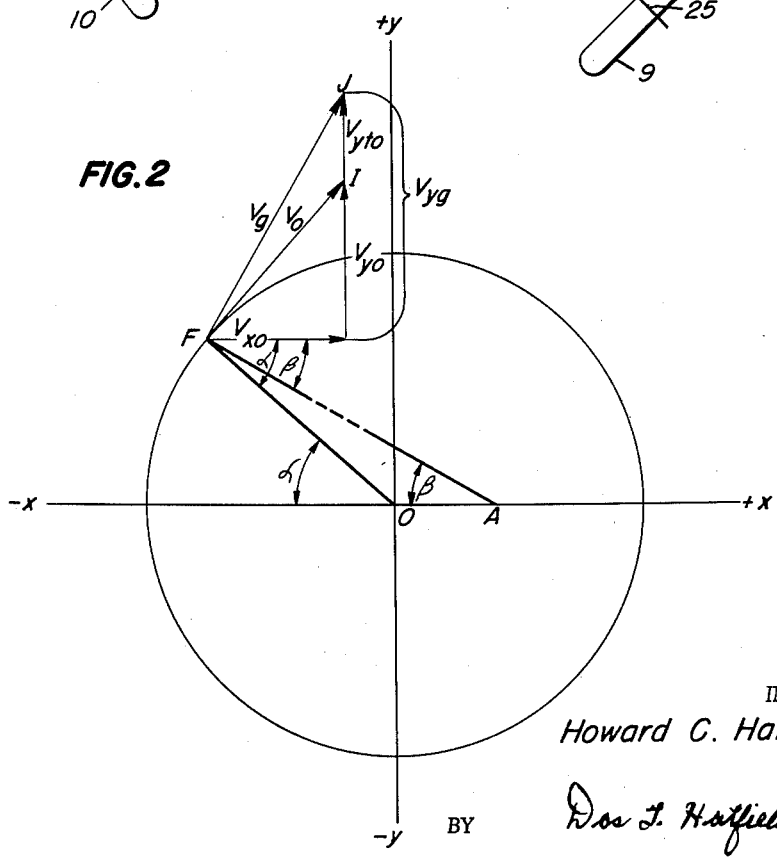
FIGS. 2 and 3 are vector diagrams to show the velocity and tractive force developed by the arrangement of FIG. 1.

For this purpose, reference is made to FIGURE 2 of the drawings which shows a vector analysis of the instantaneous velocity of any one wheel of the vehicle examined at any instant of time other than an instant when the axis of the wheel is concurrent with line OA extended. A standard coordinate system is drawn with the coordinate center at point O and so that line OA lies on the abscissa as shown. Radial arm OF is then drawn from point O in any direction not concurrent with the abscissa. A circle centered at point O and of radius OF may then be drawn to represent the path that the wheel will follow relative to point O as radial arm OF rotates clockwise about point O. A vector such as $V_o$ drawn tangent to the circle at point F then represents the instantaneous tangential velocity of the wheel relative to point O. The instantaneous velocity component of $V_o$ in the $x$ direction is given by the equation:

(1) $\quad V_{xo} = V_o \cos(90-\alpha)$

The instantaneous component of $V_o$ in the $y$ direction is:

(2) $\quad V_{yo} = V_o \sin(90-\alpha)$

But the wheel under consideration is in rolling contact with the ground and its instantaneous direction of travel relative to the ground lies in the direction of vector $V_g$. The wheel's instantaneous speed in the + or −$y$ direction can be expressed as:

(3) $\quad V_{yg} = V_{xo} \tan(90-\beta)$

Inasmuch as the wheel has an instantaneous velocity $V_{yg}$ relative to the ground and an instantaneous velocity $V_{yo}$ relative to the system center O, and inasmuch as both these components lie in a straight line, their vector difference is the instantaneous velocity $V_{yto}$ at which the system center O (and therefore the entire system) will translate in the +$y$ direction relative to the ground, which is 90 degrees to the right of the direction from A to O:

(4) $\quad V_{yto} = V_{yg} - V_{yo}$

The instantaneous velocity component $V_{xg}$ of the wheel in the + or −$x$ direction relative to the ground is given by:

(5) $\quad V_{xg} = V_{yg} \ctn(90-\beta)$

Substituting Equation 3 in Equation 5 yields:

(6) $\quad V_{xg} = V_{xo} \tan(90-\beta) \ctn(90-\beta)$ or, (7) $\quad V_{xg} = V_{xo}$ Inasmuch as the instantaneous speed component of the wheel in the + or −$x$ direction relative to the ground is equal to its instantaneous speed component in the + or −$x$ direction relative to the system centerpoint O, the system will not translate in the + or −$x$ direction relative to ground.

Referring again to FIG. 2, it can be shown that if the rotation rate of the system is held constant, the rate at which the system will translate in the +$y$ direction over ground will be directly proportional to the distance between points O and A. Triangles FOA and FIJ are similar because their corresponding sides are mutually perpendicular. Therefore their corresponding angles are equal at any instant during rotation of the system. Corresponding sides FO and FI are each of constant length. Since the lengths of corresponding sides of similar triangles are proportional, (8) $\quad \dfrac{FO}{FI} = \dfrac{OA}{IJ}$ or, (9) $\quad IJ = \dfrac{(FI)(OA)}{FO}$ But IJ is the magnitude of vector $V_{yto}$.

(10) $$V_{yto} = \frac{(FI)(OA)}{FO}$$

Since FI and FO are fixed lengths, it can readily be seen that $V_{yto}$ is directly proportional to distance OA for all occurring values of angles $\alpha$ and $\beta$. Distance OA and therefore $V_{yto}$ is controllable by the vehicle operator, as will be later shown.

It must be borne in mind that the vehicle system will translate over the ground as discussed above only if there is sufficient force acting continuously in such a manner as to maintain movement in the desired direction. It therefore is necessary to analyze the manner in which the system will utilize a constant turning moment to produce translation in the desired direction.

Figure 3:
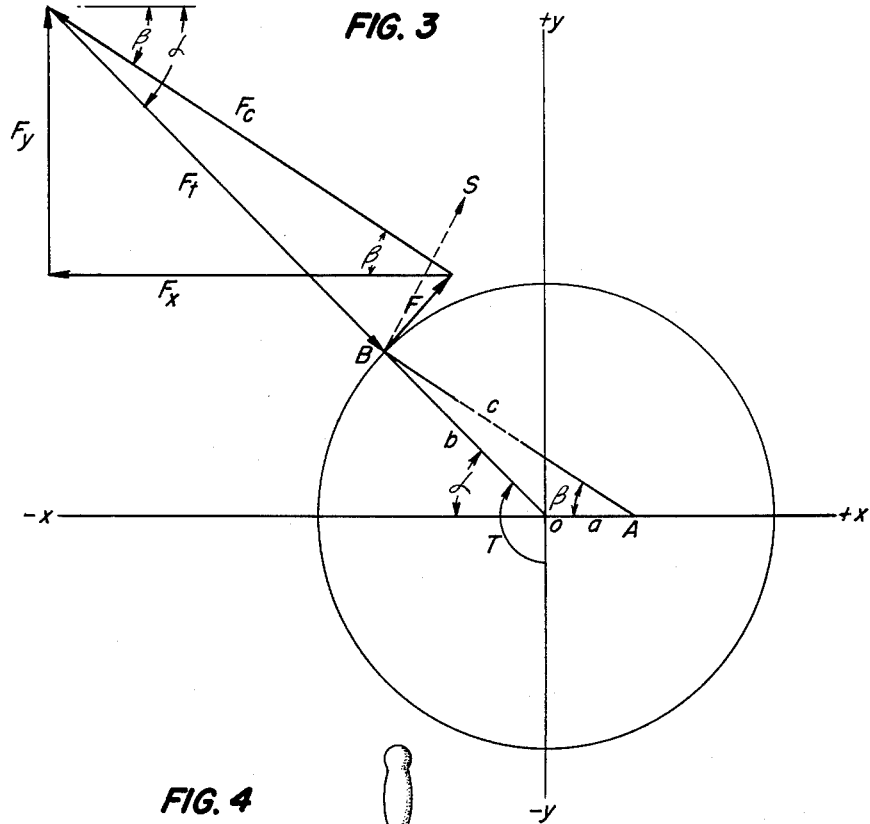

FIGURE 3 of the drawings shows a vector analysis of the instantaneous force exerted by a one-wheel vehicle system examined at any instant other than when the axis of the wheel is concurrent with line OA extended. A standard coordinate system is drawn with the coordinate center at point O and with line OA lying on the abscissa as shown. Radial arm OB is then drawn from point O in any direction not concurrent with the abscissa. A circle centered at point O and of radius OB may then be drawn to represent the path the wheel will follow relative to point O as arm OB rotates clockwise about point O. A vector F drawn tangent to the circle at point B then represents the instantaneous force exerted on the wheel as the result of a constant torque T which is applied about point O on arm OB as shown. But the wheel is in rolling contact with the ground and its instantaneous direction relative to the ground is along line BS. Neglecting bearing and rolling friction, the wheel, being impelled by a force F which is not concurrent with its path BS on the ground, will receive a reactive force $F_c$ from the ground in a direction which is perpendicular to its path BS. Radial arm OB will also exert a force $F_t$ on the wheel. The closed force vector triangle is comprised, therefore, of vectors F, $F_c$, and $F_t$. It may be proved as follows that if force F and distance OA are constant values the y component $F_y$ of vector $F_c$ is of constant magnitude at any position of the wheel as it follows its circular path about point O. Angles and sides of triangles are labeled as shown. From FIGURE 3,

(11) $$F_c = F \csc (\alpha - \beta)$$

(12) $$F_y = F_c \sin \beta$$

Substitute Equation 11 in 12,

(13) $$F_y = F \csc (\alpha - \beta) \sin \beta$$

In triangle OAB, sides $a$ and $b$ are constants, and do not vary in length as angles $\alpha$ and $\beta$ change. Using the inverse law of sines,

(14) $$\frac{\csc (\alpha - \beta)}{b} = \frac{\csc \beta}{a}$$

or

(15) $$\frac{a}{b} = \frac{\csc \beta}{\csc (\alpha - \beta)}$$

The ratio $$\frac{\csc \beta}{\csc (\alpha - \beta)}$$

is a constant which does not change as angles $\alpha$ and $\beta$ change. Solving Equation 15 for $\csc (\alpha - \beta)$,

(16) $$\csc (\alpha - \beta) = \frac{b \csc \beta}{a}$$

Substituting Equation 16 in Equation 13

(17) $$F_y = \frac{Fb \csc \beta \sin \beta}{a}$$

or

(18) $$F_y = \frac{Fb}{a}$$

Inasmuch as vector $F_y$ can be expressed in terms of three values which do not vary as the vehicle system rotates, the magnitude of vector $F_y$ must be a constant. In fact, $F_y$ is inversely proportional to $a = OA$ which is controllable by the vehicle operator.

Figure 4:
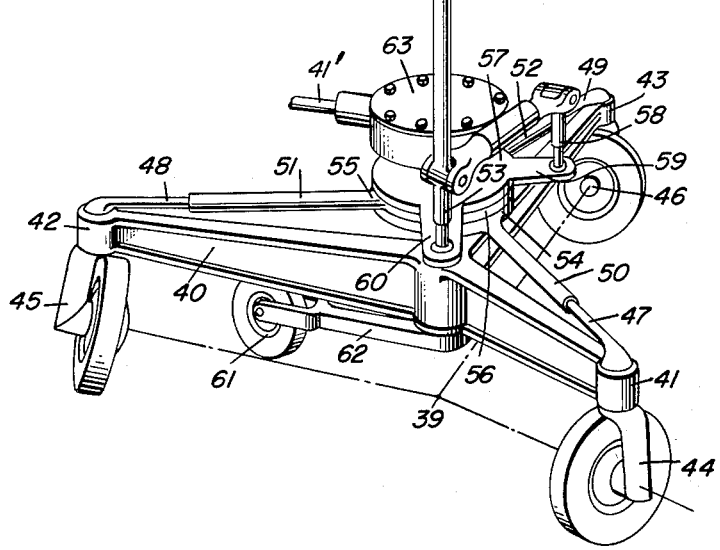
FIG. 4 is a perspective view of one form of vehicle subframe having three subframe wheels and a single trailing wheel in accordance with the invention.

If the treadwidth of the wheels were infinitely narrow, a system such as discussed above would be capable of translating in any controlled direction over the ground, with all wheels in perfect rolling contact with the ground. In the practical vehicle application, the wheels should be sloped toward the center of the rotating vehicle system; that is, so that their axes of rotation intersect the plane of the ground directly under the center of the system, as shown in FIGURE 4 which will later be described in more detail, in order to optimize the design for pure rolling contact.

Investigation of the nature and effect of the $x$ component $F_x$ of vector $F_c$ will complete the vector analysis of a one-wheel system. Again in reference to FIGURE 3,

(19) $$F_x = F_c \cos \beta$$

Substituting Formula 11 in 19.

(20) $$F_x = F \csc (\alpha - \beta) \cos \beta$$

Examination of Formula 20 indicates that $F_x$ varies from $F_x = -\infty$ when $\alpha = \beta = 0$, to $F_x = 0$ when $\beta = 90$ degrees, to $F_x = +\infty$ when $\alpha = \beta = 180$ degrees, to $F_x = 0$ when $\beta = 270$ degrees, etc. Evidently a single-wheel system would trace a sinuous course in proceeding in the $+y$ direction.

In a system comprised of two wheels mounted on opposite sides of the system centerpoint O, the instantaneous components $F_x$ of each wheel would be of equal magnitude and direction, so that such a system would also trace a sinuous course in proceeding in the $y$ direction. However, a system comprised of three or more wheels equally spaced about the rotating system center O cannot translate in any direction having a $+$ or $-x$ direction component without some of the wheels sliding sideways, whereas such systems can translate in the $+$ or $-y$ direction without sliding. In other words, such systems are in the kinematic sense stable in the $+$ or $-x$ direction and so long as point A is not concurrent with point O, they are unstable in the $+$ or $-y$ direction, similar to conventional, four-wheeled vehicles.

Moreover, the degree of stability of the system in the $+$ and $-y$ directions may be said to be variable, being directly proportional to the mechanical advantage of the drive system. The mechanical advantage of the drive system may be defined as the ratio of the circumference of the circular path of a wheel of the system about the system centerpoint O to the linear distance the vehicle translates in relation to the ground during one revolution of the drive system. When distance OA is maximum, system mechanical advantage is minimum, and stability in the $+$ and $-y$ directions is minimum. When the vehicle operator decreases the deflection of the system control lever, causing point A to approach point O, as a limit, system mechanical advantage approaches infinity as a limit, and the system approaches complete stability. For this reason no friction brakes or any other means to provide braking action are required; the novel drive system of this invention provides the vehicle operator with complete braking control of the vehicle. In the case where, for instance, the vehicle is coasting downhill, the momentum of the vehicle will cause the drive system to drive the engine as in the case of conventional automobiles. In this case the wheel system of this invention is operating at a mechanical disadvantage in driving the engine. If the operator decreases the deflection of the drive system control lever, the mechanical disadvantage will be increased, and the situation will be analogous to that in which a conventional automobile is coasting downhill in low gear. As the control lever is brought nearer its neutral (vertical) position the mechanical disadvantage will become so great that the drive system can no longer effectively drive the engine, and the engine must then resume its function of driving the drive system. When the control lever is completely returned to the neutral position the drive system is entirely stable inasmuch as the wheels of the system will then follow a circular path on the ground, a condition in which the vehicle cannot translate without skidding. Even if the engine were disengaged from the drive system, the vehicle could be effectively braked to a stop. In this case the kinematic energy of the forward motion of the vehicle would be translated into temporarily increased angular velocity of the drive system.

Referring now to FIG. 4 of the drawings, a simplified form of the basic vehicle system of the invention as arranged for use witth three driving or subframe wheels and a single trailing wheel will be described. A subframe 40 having three equi-angularly positioned arms is arranged to be rotated by shaft 41' journalled on the vehicle main frame (not shown) which supports the driving motor of any suitable type (also not shown). At the end of each arm of the subframe 40, respective vertical kingpin bearing journals 41, 42 and 43 are provided. Journalled in each of the bearings 41, 42 and 43 is a respective subframe wheel assembly 44, 45 and 46. The arrangement is preferably such that the axes of the wheel axles are inclined slightly to intersect each other at the plane of the ground at a point 39 beneath the center of the subframe 40 when the respective wheels and their axles are in tangential alignment and their axles are radial. This preferred inclination of wheel axles may serve to minimize wheel tread scrubbing. The upper end of the kingpin of each wheel assembly 44, 45 and 46 is provided with a steering arm extension 47, 48 and 49, respectively. Steering arm 47 is telescopically connected to link 50. Similarly, steering arms 48, 49 are telescopically connected to links 51, 52 respectively. A control arm 53 is connected to each of the links 50, 51 and 52 by the sleeve bearings 54, 55 and 56 which permit each link to rotate about the control arm hub 57 while maintaining axial alignment therewith.

As previously described, rotation of the shaft 41 while the subframe wheels are tangentially aligned as shown in FIG. 4 will cause the subframe 40 to rotate without translational movement over the ground. However, if the control arm 53 is moved from the position shown, the subframe wheel assemblies 44, 45 and 46 will continuously vary their steering angles in a sinusoidal fashion as the subframe 40 is rotated and the subframe will partake of a translatory movement over the ground with a direction and speed as determined by the new position of the control arm 53, all as previously described in connection with FIGS. 1 to 3 of the drawings. It should be understood that the position of the control arm 53 may be adjusted from the vehicle main frame by any suitable linkage such as the links 58, 59 and 60. Also, in order to prevent contro-rotation of the vehicle main frame, a stabilizing trailing wheel 61 carried by a trailing arm 62 that is rigidly secured to the gear-box 63 of the vehicle main frame is provided so that the main frame will then be constrained at all times to head into the direction of translatory movement over the ground as should be readily understood.

The above-described arrangement of FIG. 4 provides that the steering angle of each subframe wheel assembly 44, 45 and 46 will vary or oscillate sinusoidally with a period of sinusoidal oscillation equal to the period of one revolution of the subframe 40 and with the amplitude of each steering angle variation or oscillation variable from zero to a finite value as determined by the degree to which control arm 53 is tilted from vertical. The direction in which the control arm is deflected from the vertical will determine the phase relation between the rotation of the subframe 40 and the sinusoidal variation of the steering angles of the subframe wheel assemblies 44, 45 and 46 and hence the direction of the vehicle translatory movement over the ground. The aforementioned amplitude of the steering angle variation will, of course, determine the speed of the translatory motion of the vehicle over the ground.

FIGURES 5 through 9 of the drawings are concerned with a force vector analysis of a system comprised of three wheels such as the system just described in connection with FIG. 4 of the drawings. All views show the system centered on a standard coordinate system with point A being held fixed on the abscissa in the position shown. Rolling and bearing frictions of the wheels and mechanism are neglected, and the system is to be regarded as rotating clockwise at a uniform rate. The system is also to be regarded as towing a load which offers a constant resistance R to movement, and a torque T of constant magnitude is being applied to the system about the system centerpoint O. To facilitate ease of discussion, the angular relationship of the plane of rotation of a wheel to the tangent line of its circular path about the system center will be referred to as the steering angle of that wheel. Counterclockwise displacement of a wheel from the tangent line will be regarded as a positive steering angle and clockwise displacement will be regarded as a negative steering angle.

Figure 5:
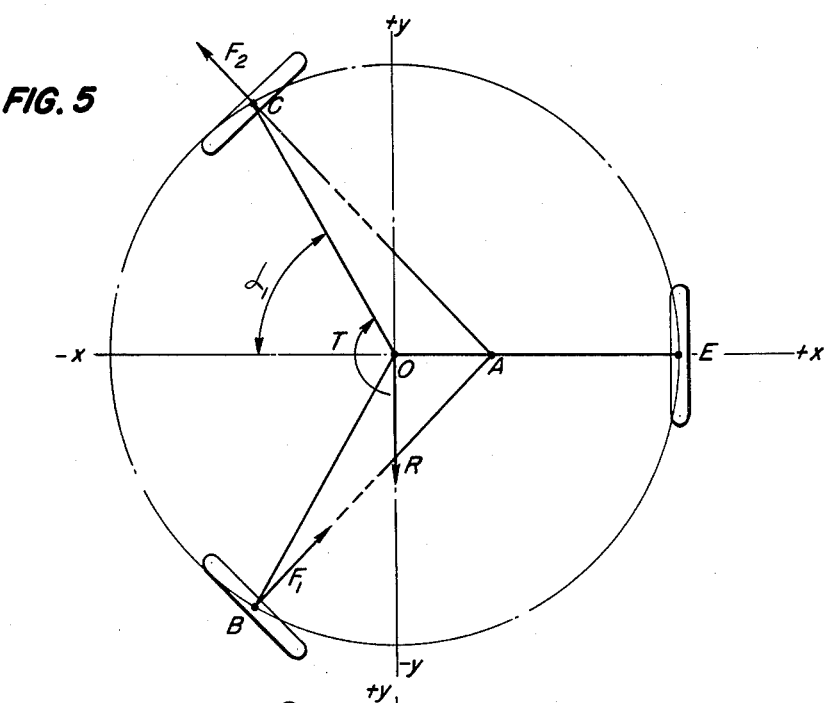
FIGS. 5, 6, 7 and 8 are views similar to FIG. 1 but showing the vector resolution of tractive forces developed by the respective subframe wheels.

FIGURE 5 shows the system at an instant when subframe arm OE is concurrent with the abscissa. The external forces acting on the system are:

Torque T, applied to the system at point O.
Force $F_1$, the reaction on the system from the wheel at B as a result of torque T.
Force $F_2$, the reaction on the system from wheel at C as a result of torque T.
Force R, a constant force resisting system translation.

At the instant shown, the steering angles of the wheels at B and C are of equal magnitude but of opposite sine, and the steering angle of the wheel at E equals zero. Therefore the wheel at E accepts no force from the system torque, and $F_1$ and $F_2$ are of equal magnitude and make equal acute angles with the abscissa. The total force available from the system torque is equally distributed between the wheels at B and C.

Figure 6:
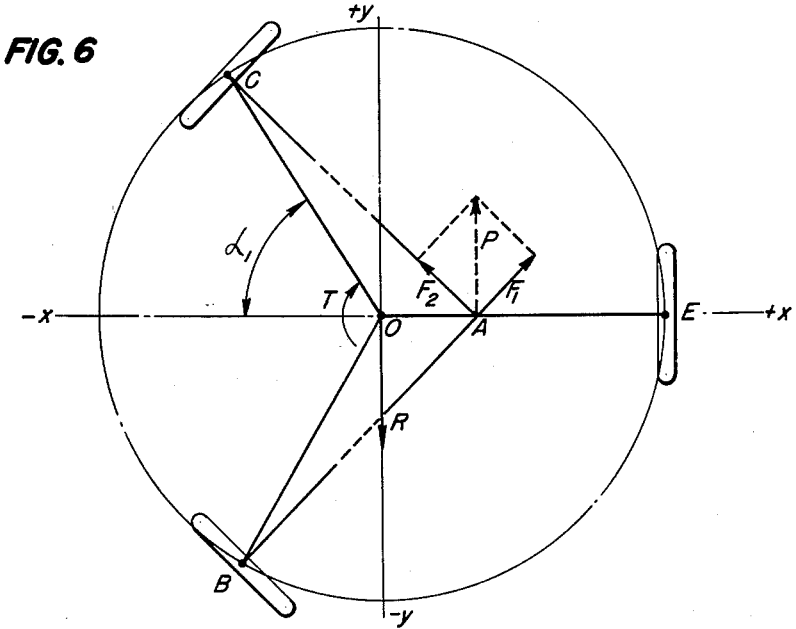

FIGURE 6 is identical to FIGURE 5 except that $F_1$ and $F_2$ have been transferred along their lines of action and are shown acting on the system at their point of intersection, point A. In addition, $F_1$ and $F_2$ are shown resolved to a single force P acting in the $+y$ direction.

Figure 7:
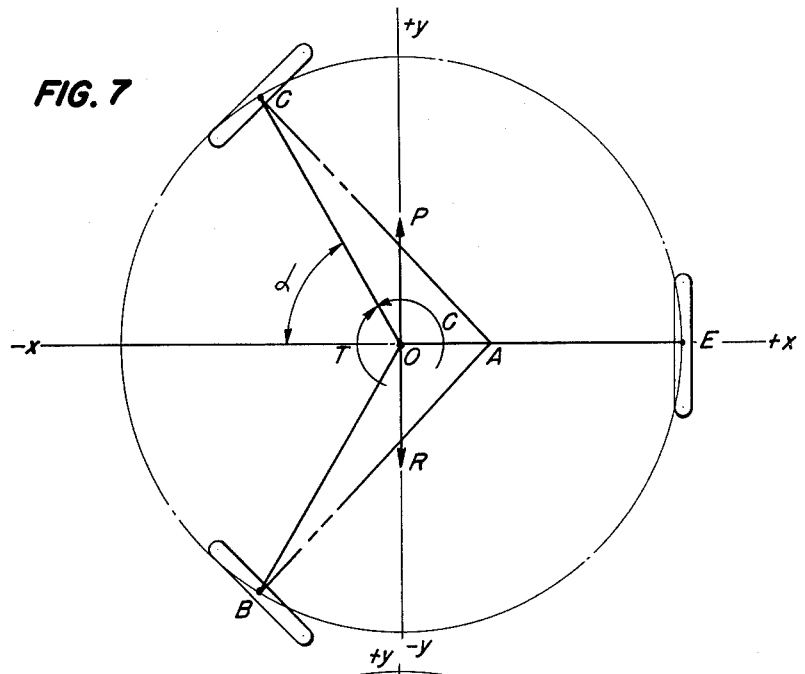

FIGURE 7 is identical to FIGURE 6 except that the resultant force P is shown acting on the system at centerpoint O, and a counterclockwise torque C (equal to P times distance OA) is applied to the system at point O to compensate for having transferred P from A to O. Thus it is shown that all external forces acting on the system are in equilibrium as the system translates at uniform velocity. $T=C$, $P=R$, and the equal but opposite $x$ components of $F_1$ and $F_2$ were cancelled in resolving for P. The stabilizing contratorque C is provided by a trailing wheel fixed to the vehicle main frame as previously discussed.

Figure 8:
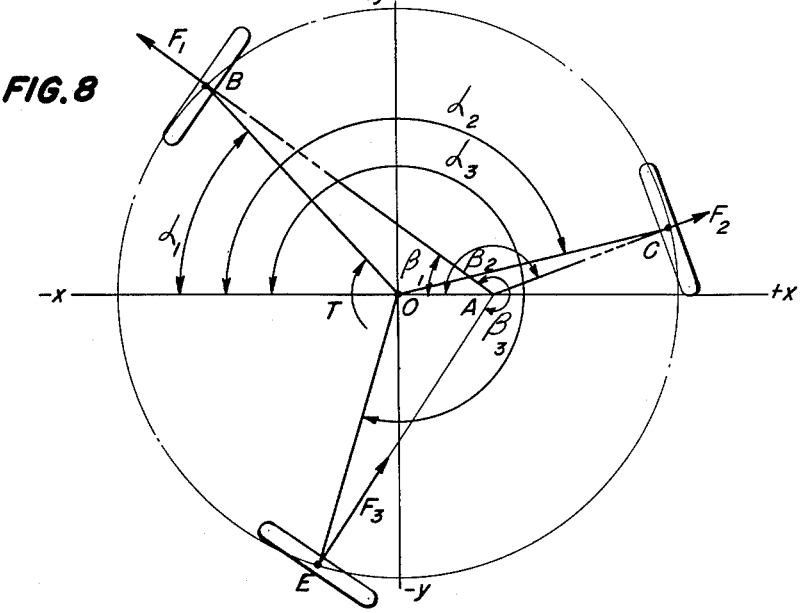

At the rotational position of the system as shown in FIGURES 5, 6 and 7, the two forces $F_1$ and $F_2$ as well as their $x$ and $y$ components can be calculated when the value of either resistive force R or torque T is known. FIGURE 8 shows the system at a rotational position such that none of the wheels has a steering angle equal to zero. In this case the number of wheel reaction forces exceeds the number of equations available for their solution. Although the direction of these forces are known, their relative magnitudes are statically indeterminate. However in a three wheel system the steering angle of one of the subframe wheels passes through zero every sixty degrees of system rotation, so that the magnitudes of the forces can be computed at every sixty degree interval during system rotation. Also, at the instant when each subframe wheel generates no $x$ component, that is, when the angle $\beta$ of one of the wheels equals 90 or 270 degrees, the $x$ components of the other two wheel reaction forces are equal in magnitude and opposite in direction. It is possible therefore to plot the relative magnitudes of the wheel reaction forces at a considerable number of rotational positions of the system, and to connect the plotted points with smooth curves and thus obtain the envelope of wheel reaction forces which are generated as the system rotates.

Figure 9:
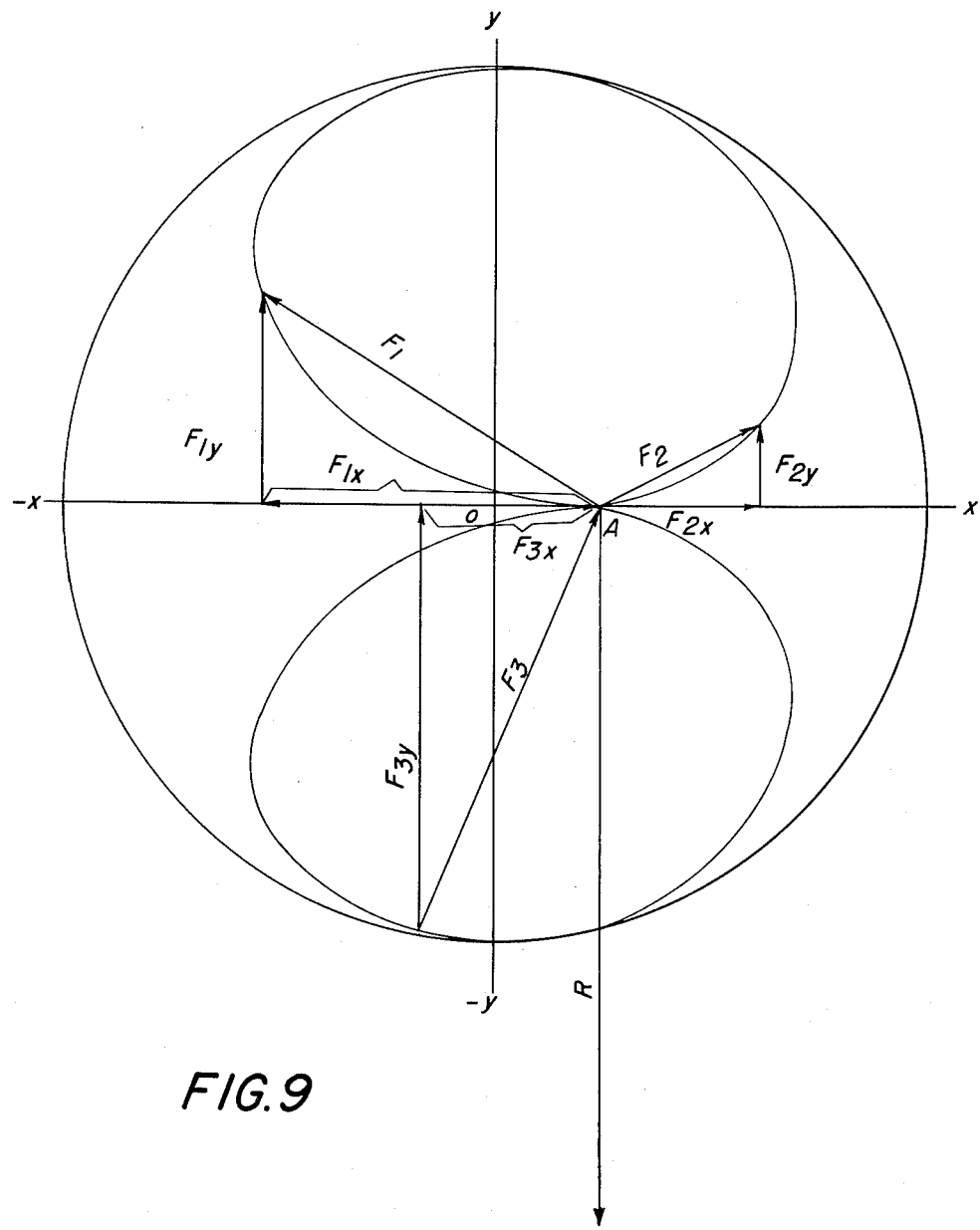
FIG. 9 is a vector diagram which shows the envelope of wheel reaction forces generated by a three wheel system.

FIGURE 9 shows the envelope of wheel reaction forces generated by a three wheel system. The two closed curves, one in the upper semicircle and one in the lower semicircle, together with the constant vector R, form the envelope which shows that at all rotational positions of the system, $\Sigma F_x=0$ and $\Sigma F_y=0$. For example, the rotational position of the system as shown in FIGURE 8 is also shown in FIGURE 9 where by measurement one may observe that the sum of all the $x$ components equals zero and that the sum of all $y$ forces equals zero. Any occurring values of $\alpha_1$, $\alpha_2$, and $\alpha_3$ may be drawn in similar fashion on FIGURE 9 and the envelope curves will define the relative magnitudes of the wheel reaction forces with similar results.

Similar equations and graphs for systems comprised of more than three wheels symmetrically mounted about the system center would show that for all such systems, $\Sigma F_x=0$, $\Sigma M_o=0$, and $P=R$.

The foregoing analysis has assumed rigidity in the wheel tires, whereas in the practical machine each wheel will be displaced from its footprint area by a distance which will be proportional to the flex factor of the tire and the lateral force being transmitted by the tire. The displacement of each wheel will be directed along a line through point A whenever occurring. If the flex factors (analogous to the stiffness of a spring) of the tires are equal and constant, the graph in FIGURE 9 may be used to analyze the effect. The ordinate values of the curves may be considered to represent wheel displacement due to tire flex. Wheel displacement will be directed toward point A when a tire is above the abscissa, and away from point A when the tire is below the abscissa. Vector resolution of the displacements will show a constant displacement of the system directed in the $-y$ direction, which will cause the system to translate at a slightly slower yet constant rate of speed. The direction of system translation will be undisturbed by the effect.

Referring now to FIG. 10 of the drawings, a slightly modified form of the invention previously described in connection with FIG. 4 of the drawings is shown. In this arrangement of the invention, the three nested sleeve bearings 54, 55 and 56 as shown in FIG. 4 are replaced by a single control hub or crosshead 70 (FIG. 10) whose lateral position relative to the drive axis through the center of rotation of the subframe 71 is determined by the control lever 72. As the subframe 71 is rotated, the relatively stationary control hub or crosshead 70 imparts a reciprocal movement to links 73, 74 and 75 unless the hub 70 is adjusted to a position concentric with the axis of rotation of the subframe 71. The reciprocal motion of links 73, 74 and 75 will cause a sinusoidal variation of the steering angles of subframe wheels since the links are connected by respective crank arms 79, 80 and 81 to the subframe wheel assemblies 76, 77 and 78.

The effective operation of the arrangement as described is essentially the same as that previously described for the form of the invention shown by FIG. 4, but for a detailed understanding of the operation reference is now made to the diagrammatic illustrations of FIGS. 11 and 12 of the drawings.

FIG. 11 is a diagrammatic top view of the mechanism utilized by the three-wheeled system shown in FIGURE 10, in which crank and crosshead slider mechanisms are employed. The crosshead slider 70 for all three wheels 76, 77 and 78 of the system may hereinafter also be referred to as wave generator 70. One arm of right angle link 73 extends with close-fitting, operating tolerance into one of the lateral crosshead holes in wave generator 70 as shown. The other arm of right angle link 73 is pivot-connected to crank arm 82 and to steering arm 79. Steering arm 79, in turn, pivots about spindle 83 and is fixed to the short axle of wheel 76. The steering arms of wheels 77 and 78 are similarly connected to wave generator 70. If, as previously mentioned, the vertical centerline of rotation of wave generator 70 is held coincident with the vertical centerline of rotation of subframe 71, the wave generator 70 will hold the steering angles of wheels 76, 77 and 78 equal to zero as the system rotates, so that the vehicle subframe will not translate in relation to the ground. However, if wave generator 70 is laterally displaced from the system center in any direction rotation of the system will cause the right angle links such as 73 to oscillate radially in relation to the subframe center. This reciprocal motion will be imparted to the steering arms of wheels 76, 77 and 78, causing the steering angles of these wheels to vary in pure sinusoidal fashion, causing vehicle translation relative to the ground. If wave generator 70 is held fixed in the position shown in FIGURE 11, for instance, the axes of rotation of wheels 76, 77 and 78 will, if extended, converge at and remain coincident with point A as the system rotates. Point A has the same significance for this system as point 20 has in relation to FIGURE 1 of the drawings, and as point A has in relation to FIGURES 2, 3, 5, 6, 7 and 8.

The system shown in FIGURE 12 differs from that shown in FIGURE 11 only in that the linkage arms of the system are reversed, that is, the links between the wave generator 70 and the wheel steering arms are on the other side of the subframe arms 85, 86 and 87. By combining the form of the invention of FIGURE 11 with the form of the invention of FIGURE 12, in a single vehicle, a dual three-wheeled vehicle may be obtained. Assume now that the subframe shown in FIGURE 11 is supporting the rear half of a vehicle (such as a forklift truck), and the subframe shown in FIGURE 12 is supporting the front half of the vehicle. Assume further that the two subframes are linked mechanically to rotate at equal rotation rates but in opposite directions, as indicated by arrows 90 and 91. Wave generator 70 in FIGURE 11 is shown displaced in a southerly direction so that this three-wheeled system is translating in a northerly direction over the ground, whereas the wave generator 70 in FIGURE 12 is displaced in a northerly direction so that this system is translating in a southerly direction. The net effect on a vehicle supported on these two subframes would be rotation of the vehicle in a clockwise direction about point 92, located midway between the two system centers. If both wave generators are equally displaced in the same direction, such a vehicle will translate in the opposite direction without changing its heading.

FIGURE 13 of the drawings shows a complete vehicle embodying a three-wheeled subframe arrangement generally similar to that described in connection with FIGURE 10 of the drawings. A vehicle main frame 100 supports a motor 101, a driver's seat 102 and such acceleration controls 103 and body shrouding 104 as may be desired. The gear box 105 is also fixed to the vehicle main frame 100 and is provided with a central depending column 106 to which is secured the trailing wheel arm 107 and trailing wheel 108 that prevents contra-rotation of the main frame 100. The motor 101 driving through a conventional transmission gear box 109, pinion gear 110 and ring gear 111, may cause rotation of planet pinions 112, 113 and column sleeve 114, to cause rotation of the subframe 115 with the steering angles of the subframe wheels controlled by the control stick 116 to thereby cause vehicle translation over the ground as desired. It should be obvious that such a vehicle as shown by FIG. 13 of the drawings is fully maneuverable and completely controllable so that it may be particularly suited for towing and maneuvering heavy vehicles such as airplanes or the like. For example, a tow hitch 117 may be pivotally connected around the center 118 of the vehicle main frame 100 which may be circular so that the vehicle may instantaneously assume any heading with respect to the towed load.

All of the forms of the invention thus far described have employed a system of levers and crank arms to impart the sinusoidal variation of steering angle to the wheels. In place of levers as described, gearing may be employed such as shown in FIGURES 14, 15 and 16 of the drawings, to which reference is now made.

Control column 150 is rigidly attached to a hollow sphere 151 as shown. The external surface of sphere 151 mates with close operating tolerance with the internal spherical surface of the hub of the subframe 152. The subframe 152 serves a multiplicity of functions: It constrains sphere 151 from all motion except rotation about the subframe centerpoint 153. It serves as a gearbox housing. It is shaped to form subframe arms 155, 156 and 157. The system driveshaft 158 is flanged at the bottom and bolted to the subframe 152 as shown in FIGURE 14. The gearbox which transmits torque to shaft 158 is not shown. Sphere 151 has an annular groove cut into its external surface as shown in FIGURE 16. The groove is bounded at top and bottom by thrust-bearing races 160 and 161 which in turn bear on rollers 162 and 163, respectively. Segments 164, 165 and 166 fit precisely into the annular groove of sphere 151 and are supported by the thrust-bearing races 160 and 161. Segments 164, 165 and 166 may by this arrangement rotate in unison within the groove of sphere 151. Their tolerance of fit between thrust-bearing races 160 and 161 is also such as to permit each segment to move in relation to races 160 and 161. Small gear segments 170, 171 and 172 have cylindrical protrusions which radiate toward the system centerpoint 153 and which fit at close operating tolerance into holes in segments 164, 165 and 166, respectively. The small gear segments 170, 171 and 172 have external helical teeth which mate respectively with gears 173, 174 and 175, as shown. The rotational position of gear 173 contrmols the steering angle of wheel 176 by means of arms 177 and 178, and through link 179. Similarly, the rotational positions of gears 174 and 175 determine the steering angles of wheels 180 and 181, respectively.

The small gear segments 170, 171 and 172 protrude into and are free to move vertically within vertical grooves, such as 182 in FIGURE 14, which are cut into the inner spherical surface of the hub of subframe 152. By this arrangement, the small gear segments 170, 171 and 172, and segments 164, 165 and 166 as well, are forced to move in unison with subframe 152 as it rotates about the vehicle centerline 153. However, sphere 151, and therefore control column 150 are restrained from rotating about the system centerline 153 by link 183 which is attached to the main frame of the vehicle (not shown) by ball and socket joint 184 and to sphere 151 by ball and socket joint 185. Link 183 is installed so as to be perpendicular to centerilne 153 and it bears a tangential relationship to sphere 151.

Now, assume that drive shaft 158 is forced to rotate in a clockwise direction as viewed from above, so that the subframe 152 is driven in a clockwise direction. If control column 150 is held vertical, the annular groove in sphere 151 is parallel to the plane of rotation of the system. Therefore, there will be no vertical oscillation of small gear segments 170, 171 and 172, and consequently gears 173, 174 and 175 will impart no angular steering changes to the wheels, so that their steering angles remain equal to zero, not causing the vehicle to translate in relation to the ground. However, if control column 150 is displaced from the vertical, for instance, in the direction and amount shown in FIGURE 14, the annular groove of sphere 151 will be tilted downwardly in such direction. This will cause segments 164, 165 and 166, and therefore small gear segments 170, 171 and 172 to oscillate vertically in sinusoidal fashion as the system rotates. The vertical oscillation of segments 170, 171 and 172 will cause gears 173, 174 and 175 to oscillate angularly in sinusoidal fashion, causing the steering angles of wheels 176, 180 and 181 to oscillate angularly, identical to the manner of oscillation of the steering angles of the system shown in FIGURE 4 of the drawings.

There has been previously described in connection with FIGURES 11 and 12 of the drawings a form of the invention in which two three-wheeled subframe assemblies are combined in a single vehicle without the requirement of trailing wheel stabilizing devices. Referring now to FIGURE 17 as it relates to FIGURES 11 and 12 of the drawings, details of a control system for such a vehicle will now be described.

In general, simultaneous control over both three-wheeled systems, or over two multi-wheeled system, is obtained by manipulating a single control column 200. Construction of the control system is as follows:

The lower extremity of control column 200 protrudes into and is supported by a cylindrical bearing surface within the upper portion of gear housing 201 in such a fashion that it may be rotated about its own centerline 202 but is constrained from movement along centerline 202. Small bevel gear pinion 203 is fixed to the lower extremity of control column 200 and meshes with beveled gear segments 204 and 205. A hollow shaft portion of beveled gear segment 205 protrudes forward into and is supported by a cylindrical bearing surface cut into control gear housing 201, so that beveled gear segment 205 is constrained from all motion within gear housing 201 except rotation about centerline 206 which is the centerline of the cylindrical bearing surface cut into the forward portion of gear housing 201. Centerline 206 is perpendicular to centerline 202. The shaft portion of beveled gear segment 204 protrudes forward into hollow shaft of beveled gear segment 205, so that beveled gear segment 204 is likewise constrained from all motion within gear housing 201 except rotation about centerline 206. The three gears 203, 204 and 205 constitute a differential gear system. The lower extremity of beveled gear segment 205 is in the form of a cylindrical shaft (centerline 208) which protrudes at close operating tolerance into a mating cylindrical hole cut through the center of the ball of ball and socket joint 209.

The short shaft 210, whose centerline is 211, similarly fits into a cylindrical hole cut through the center of the ball of ball and socket joint 212. Point 213 is an end view of the centerline of a pivot joint connection 214 which connects beveled gear segment 204 to shaft 215. Shaft 215 is mounted in and supported by cylindrical bearings 216 and 217. Bearings 216 and 217 are fixed to the frame of the vehicle (not shown) and permit shaft 215 to rotate about its own centerline 218 but constrain it from movement along centerline 218 in relation to the frame of the vehicle. Shaft 215 is connected to short shaft 210 by a pivotal joint 220. The centerline of pivot 220 is perpendicular to centerlines 218 and 211.

Balls 209 and 212 are mounted with close working tolerance within spherical sockets cut in control bar 221 as shown. The crosshead or wave generator 70 of FIGURE 11 is attached to control bar 221 in the location shown by means of a radial bearing 223 which permits wave generator 70 of FIGURE 11 to rotate in unison with the drive system it controls. Similarly, the crosshead or wave generator 70 of FIGURE 12 is attached to control bar 221 by means of radial bearing 225 which permits wave generator 70 of FIGURE 12 to rotate in unison with the drive system which it controls. The cross-sectional view of wave generator 70 in FIGURE 11 and wave generator 70 of FIGURE 12 of the drawings is taken along line 18—18 in FIGURE 17. In FIGURE 17, centerline 218, 206, 202 and 208 intersect at pivot point 213. Centerline 208 is perpendicular to centerline 206. It should be noted that the wheel control links of each drive system constrain the wave generator controlling it to remain in the plane defined by line 18—18 in FIGURE 17. A portion of this control system could be constructed in an alternate manner, that is, ball and socket joints 209 and 212 could be replaced by mechanically equivalent universal couplings provided that relative movement between shaft and coupling is permitted along centerlines 208 and 211.

In operation, this control system would function as follows: It is the object of this control system to control the lateral position and orientation of control bar 221 by means of manipulating control column 200, and thereby control the lateral positions occupied by wave generators 70 of FIGURES 11 and 12 within the plane defined by line 18—18 of FIGURE 17. This control system is in its neutral condition when control column 200 is vertical and when the T-handle 230 fixed to the upper extremity of control column 200 is oriented fore and aft with respect to the body of the vehicle. In this condition, the vertical rotational centerline 231 of wave generator 70 of FIGURE 11 is coincident with the vertical rotational center of the drive system of FIGURE 11, and the vertical rotational centerline 232 of wave generator 70 of FIGURE 12 is coincident with the vertical rotational center of its drive system. Also, in this condition centerline 208 is coincident with centerline 202, centerline 206 is coincident with centerline 218, centerlines 202 and 211 are perpendicular to centerline 218, and centerlines 202 and 211 are vertical. With both wave generators 70 centered in relation to their respective system centers, neither drive system subframe will translate in relation to the ground.

Now, if the vehicle operator tilts control column 200 away from its vertical position, for instance toward the front of the vehicle, the control column 200, including control gear box 201 and the components its contains, will be roated in a clockwise direction about pivot point 213, causing the lower cylindrical extremity of beveled gear segment 205 to force ball 209 toward the rear, which in turn drives control bar 221 including both wave generators 70 toward the rear of the vehicle. As explained earlier, the drive systems shown in FIGURES 11 and 12 of the drawings will translate in the direction opposite to that in which their wave generators are displaced. Forward angular displacement of control column 200, therefore, causes both drive systems to propel the vehicle in the forward direction. Conversely, if the vehicle operator displaces control column 200 toward the rear of the vehicle, the lower cylindrical extremity of beveled gear segment 205 will force ball 209, including control bar 221 and both wave generators 70, toward the front of the vehicle, which will cause both drive systems to propel the vehicle toward the rear.

If control column 200 is tilted from its neutral position toward the right side of the vehicle (toward the viewer in FIGURE 17), control column 200, shaft 215, and control gear housing 201 including all components contained therein, will rotate about centerline 218 in the counterclockwise direction as viewed from the front of the vehicle. Such rotation will cause ball 209 to be displaced toward the left side of the vehicle. The rotation of shaft 215 will cause short shaft 210 to displace ball 212 toward the left side of the vehicle. With balls 209 and 212 both displaced toward the left side of the vehicle, control bar 221 including both wave generators 70 will also be displaced toward the left side of the vehicle. This condition will cause both drive systems to propel the vehicle in broadside fashion to the right, without changing its heading.

If control column 200 is tilted toward the left side of the vehicle, the action will be reversed, that is, both wave generators 70 in FIGURES 11 and 12 will be displaced toward the right side of the vehicle, causing both drive systems to propel the vehicle in broadside fashion to its left, with no accompanying change in heading.

Fore or aft tilt of the control column 200 may be combined with sidewise tilt to cause the drive systems to propel the vehicle in any direction relative to the front of the vehicle.

Vehicle translation will occur in the direction in which control column 200 is tilted.

If, from the neutral control position, the vehicle operator uses the T-handle 230 fixed to the upper extremity of control column 200 to angularly rotate control column 200 about its own centerline 202 through some small angle counterclockwise as viewed from above, the control system linkage will displace wave generators 70 toward opposite sides of the vehicle as follows: Small beveled gear pinion 203, fixed to control column 200, will drive beveled gear segments 204 and 205 in opposite directions but through equal angles about centerline 206. The direction in which beveled gear segment 205 will be driven is clockwise as viewed from the front of the vehicle, whereas beveled gear segment 204 will be driven counterclockwise as viewed from the front of the vehicle. Such rotations will cause the lower extremity of beveled gear segment 205 to drive ball 209 toward the right side of the vehicle, whereas beveled gear segment 204 will drive shaft 215 in the counterclockwise direction, causing short shaft 210 to drive ball 212 toward the left-hand side of the vehicle. Such displacement of balls 209 and 212 will cause control bar 221 to rotate about centerline 233 through some small angle clockwise as viewed from above. Wave generator 70 of FIGURE 11 will therefore be displaced toward the left-hand side of the vehicle and wave generator 70 of FIGURE 12 will be displaced toward the right-hand side of the vehicle. Such displacements of the wave generators will cause the drive system of FIGURE 11 which supports the rear half of the vehicle to propel the rear half of the vehicle toward the right, whereas the drive system of FIGURE 12 supporting the front half of the vehicle will be caused to propel that portion of the vehicle toward the left. The net result is that the vehicle will rotate in relation to the ground about vertical centerline 333 (point 92 between FIGURES 11 and 12) in a counterclockwise direction as viewed from above. When control column 200 is returned to its neutral position, rotation of the vehicle will cease.

If control column 200 is rotated about its centerline 202 in the clockwise direction as viewed from above, the vehicle will rotate in the clockwise direction about centerline 233, "turning on a dime," so to speak.

This control system of FIGURE 17 will be completely intuitive to vehicle operators. The vehicle will translate in the direction in which the control column 200 is displaced. The further the control column 200 is displaced, the faster will be the speed of translation. The heading of the vehicle will swing right or left in respective response to right or left rotational displacements of the T-handle 230 of control column 200. Furthermore, inasmuch as this control system may be manipulated with one hand, an operator's ability to manipulate other controls, such as a clutch pedal, an accelerator pedal, a gear shift lever, or such auxiliary hand controls as hydraulic controls of a forklift truck, is not impaired.

The preceding description has shown various arrangements of the invention in which three-wheeled revolving subframes were used. When only a single revolving subframe is used to support the vehicle main frame, the use of a single trailing wheel has been described, but it should be understood that various arrangements and numbers of trailing wheels may be provided. Also, the subframe may be provided with either less or more subframe wheels than the three described, and more than one wheel assembly may be mounted on each arm of the subframe. Also, the number of subframes supporting the vehicle main frame may be one or more, and when more than one subframe is used, the use of trailing wheels to establish vehicle headings and prevent contra-rotation of the vehicle main frame may not be required since one of the subframes may be controlled for this purpose.

Various other modifications within the scope of the appended claims will occur to those skilled in the art.

I claim:

1. An omnidirectional drive land vehicle comprising, a main frame,
   a subframe,
   means to pivotally support said main frame on said subframe to permit relative rotation therebetween about an axis generally perpendicular to the ground,
   at least one wheel pivotally connected to said subframe at a point radially spaced from the axis of rotation of said subframe,
   means to rotate said subframe,
   steering means to determine the steering angle axis of rotation of each wheel,
   control means for said steering means to cyclically vary the steering angle of each wheel from a position in which each wheel is in tangential alignment with the rotation of said subframe with a period equal to each complete rotation of said subframe and with controllable amplitude and phase relation of each wheel to the rotation of said subframe whereby the vehicle will translate over the ground in a direction determined by the phase relation of the variation of steering angle and with a speed determined by the amplitude of the steering angle variation of each wheel,
   and means to head said main frame in the direction of its movement over the ground.

2. The invention of claim 1 in which said means to head said main frame is comprised of a trailing arm having its trailing axis fixed in relation to said main frame and with a trailing wheel in contact with the ground.

3. The invention of claim 1 in which the axis of rotation of each wheel is inclined relative to the ground towards the axis of rotation of the subframe.

4. An omnidirectional drive land vehicle comprising, a main frame,
   a subframe,
   means to pivotally support said main frame on said subframe to permit relative rotation therebetween about an axis generally perpendicular to the ground,
   at least one wheel pivotally connected to said subframe at a point radially spaced from the axis of rotation of said subframe,
   means to rotate said subframe,
   steering means to determine the steering angle axis of rotation of each wheel,
   control means for said steering means responsive to the rotation of said subframe to cyclically vary the steering angle of each wheel from a position in which each wheel is in tangential alignment with the rotation of said subframe with a period equal to each complete rotation of said subframe and with controllable amplitude and phase relation of each wheel to the rotation of said subframe whereby the vehicle will translate over the ground in a direction determined by the phase relation of the variation of steering angle and with a speed determined by the amplitude of the steering angle variation of each wheel,
   and means to head said main frame in the direction of its movement over the ground.

5. The invention of claim 4 in which said control means is comprised of a system of levers interconnecting said main frame and said wheel.

6. The invention of claim 4 in which said control means is comprised of gearing interconnecting said main frame and said subframe, and each wheel is connected to said gearing by a steering control link.

7. The invention of claim 4 in which said means to head said main frame is comprised of a trailing arm having its trailing axis fixed in relation to said main frame and with a trailing wheel in contact with the ground.

8. An omnidirectional drive land vehicle comprising, a main frame,
   a subframe,
   means to pivotally support said main frame on said subframe to permit relative rotation therebetween about an axis generally perpendicular to the ground,
   at least one wheel pivotally connected to said subframe at a point radially spaced from the axis of rotation of said subframe,
   means to rotate said subframe,
   steering means to determine the steering angle axis of rotation of each wheel,
   control means for said steering means to cyclically vary the steering angle of each wheel from a position in which each wheel is in tangential alignment with the rotation of said subframe with a period equal to each complete rotation of said subframe and with controllable amplitude and phase relation of each wheel to the rotation of said subframe whereby the vehicle will translate over the ground in a direction determined by the phase relation of the variation of steering angle and with a speed determined by the amplitude of the steering angle variation of each wheel,
   and means to prevent contra-rotation of said main frame relative to said subframe.

9. The invention of claim 8 in which said means to prevent contra-rotation of said main frame is comprised of an auxiliary subframe pivotally mounted on said main frame for rotation about an axis generally perpendicular to the ground,
   means to rotate said auxiliary subframe in synchronism with the rotation of said subframe,
   said auxiliary subframe having at least one wheel pivotally connected thereto at a point radially spaced from its axis of rotation,
   second steering means to determine the steering angle axis of rotation of each wheel on said auxiliary subframe,
   and means interconnecting said control means and said second steering means to controllably and cylically vary the steering angle of each wheel of the auxiliary subframe as the steering angle of each wheel of the subframe is varied.

10. The invention of claim 8 in which said means to prevent contra-rotation of said main frame is comprised of an auxiliary subframe pivotally mounted on said main frame for rotation about an axis generally perpendicular to the ground,
   means to rotate said auxiliary subframe in synchronism with the rotation of said subframe,
   said auxiliary subframe having at least one wheel pivotally connected thereto at a point radially spaced from its axis of rotation,
   second steering means to determine the steering angle axis of rotation of each wheel on said auxiliary subframe,
   and means interconnecting said control means and said second steering means to controllably and cylically vary the steering angle of each wheel of the auxiliary subframe to determine the heading of the main frame in its movement over the ground.

11. An omnidirectional drive land vehicle comprising,
a main frame,
a subframe,
means to pivotally support said main frame on said subframe to permit relative rotation therebetween about an axis generally perpendicular to the ground,
at least one wheel pivotally connected to said subframe at a point radially spaced from the axis of rotation of said subframe,
means to rotate said subframe,
steering means to determine the steering angle axis of rotation of each wheel,
control means for said steering means responsive to the rotation of said subframe to cyclically vary the steering angle of each wheel from a position in which each wheel is in tangential alignment with the rotation of said subframe with a period equal to each complete rotation of said subframe and with controllable amplitude and phase relation of each wheel to the rotation of said subframe whereby the vehicle will translate over the ground in a direction determined by the phase relation of the variation of steering angle and with a speed determined by the amplitude of the steering angle variation of each wheel,
and means to prevent contra-rotation of said main frame relative to said subframe.

12. The invention of claim 11 in which said means to prevent contra-rotation of said main frame is comprised of an auxiliary subframe pivotally mounted on said main frame for rotation about an axis generally perpendicular to the ground,
means to rotate said auxiliary subframe in synchronism with the rotation of said subframe,
said auxiliary subframe having at least one wheel pivotally connected thereto at a point radially spaced from its axis of rotation,
second steering means to determine the steering angle axis of rotation of each wheel on said auxiliary subframe,
and means interconnecting said control means and said second steering means to controllably and cyclically vary the steering angle of each wheel of the auxiliary subframe as the steering angle of each wheel of the subframe is varied.

13. An omnidirectional drive land vehicle comprising,
a main frame,
a subframe,
means to pivotally support said main frame on said subframe to permit relative rotation therebetween about an axis generally perpendicular to the ground,
at least one wheel pivotally connected to said subframe at a point radially spaced from the axis of rotation of said subframe,
means to rotate said subframe,
steering means to determine the steering angle axis of rotation of each wheel,
control means for said steering means to cyclically vary the steering angle of each wheel from a position in which each wheel is in tangential alignment with the rotation of said subframe,
a single control column universally mounted to extend perpendicularly from said main frame in a central position and movable towards any desired direction of translational movement of the main frame over the ground,
means to connect said column to said control means in a manner to operate the control means to predetermine the phase relation of the cyclical variation of the steering angle of each wheel relative to the rotation of said subframe in accordance with the direction of movement of said column from the central position with the amplitude of the steering angle variation of each wheel determined in accordance with the degree of movement of said column from the central position whereby the vehicle will translate over the ground in a direction determined by the phase relation of the variation of steering angle and with a speed determined by the amplitude of the steering angle variation of each wheel, and means to head said main frame in the direction of its movement over the ground.

14. The invention of claim 13 in which said control means is comprised of a system of levers interconnecting said main frame and said wheel.

15. The invention of claim 13 in which said control means is comprised of gearing interconnecting said main frame and said subframe, and each wheel is connected to said gearing by a steering control link.

16. The invention of claim 13 in which said means to head said main frame is comprised of a trailing arm having its trailing axis fixed in relation to said main frame and with a trailing wheel in contact with the ground.

17. An omnidirectional drive land vehicle comprising,
a main frame,
a subframe,
means to pivotally support said main frame on said subframe to permit relative rotation therebetween about an axis generally perpendicular to the ground,
at least one wheel pivotally connected to said subframe at a point radially spaced from the axis of rotation of said subframe,
means to rotate said subframe,
steering means to determine the steering angle axis of rotation of each wheel,
control means for said steering means to cyclically vary the steering angle of each wheel from a position in which each wheel is in tangential alignment with the rotation of said subframe,
a single control column universally mounted to extend perpendicularly from said main frame in a central position and movable towards any desired direction of translational movement of the main frame over the ground,
means to connect said column to said control means in a manner to operate the control means to predetermine the steering angle of each wheel to tangentially align each wheel with the rotation of said subframe when the column is in the normal position and to predetermine phase relation of the cyclical variation of the steering angle of each wheel relative to the rotation of said subframe in accordance with the direction of movement of said column from the central position with the amplitude of the steering angle variation of each wheel determined in accordance with the degree of movement of said column from the central position whereby the vehicle will translate over the ground in a direction determined by the phase relation of the variation of steering angle and with a speed determined by the amplitude of the steering angle variation of each wheel,
and means to head said main frame in the direction of its movement over the ground.

18. The invention of claim 17 in which said control means is comprised of a system of levers interconnecting said main frame and said wheel.

19. The invention of claim 17 in which said control means is comprised of gearing interconnecting said main frame and said subframe, and each wheel is connected to said gearing by a steering control link.

20. The invention of claim 17 in which said means to head said main frame is comprised of a trailing arm having its trailing axis fixed in relation to said main frame and with a trailing wheel in contact with the ground.

21. An omnidirectional drive land vehicle comprising,
a main frame,
a subframe,
means to pivotally support said main frame on said subframe to permit relative rotation therebetween about an axis generally perpendicular to the ground,
at least one wheel pivotally connected to said subframe at a point radially spaced from the axis of rotation of said subframe,
means to rotate said subframe,
steering means to determine the steering angle axis of rotation of each wheel,
control means for said steering means responsive to the rotation of said subframe to cyclically vary the steering angle of each wheel from a position in which each wheel is in tangential alignment with the rotation of said subframe,
a single control column universally mounted to extend perpendicularly from said main frame in a central position and movable towards any desired direction of translational movement of the main frame over the ground,
means to connect said column to said control means in a manner to operate the control means to predetermine the phase relation of the cyclical variation of the steering angle of each wheel relative to the rotation of said subframe in accordance with the direction of movement of said column from the central position with the amplitude of the steering angle variation of each wheel determined in accordance with the degree of movement of said column from the central position whereby the vehicle will translate over the ground in a direction determined by the phase relation of the variation of steering angle and with a speed determined by the amplitude of the steering angle variation of each wheel,
and means to head said main frame in the direction of its movement over the ground.

22. An omnidirectional drive land vehicle comprising,
a main frame,
a subframe,
means to pivotally support said main frame on said subframe to permit relative rotation therebetween about an axis generally perpendicular to the ground,
at least one wheel pivotally connected to said subframe at a point radially spaced from the axis of rotation of said subframe,
means to rotate said subframe,
steering means to determine the steering angle axis of rotation of each wheel,
control means for said steering means to cyclically vary the steering angle of each wheel from a position in which each wheel is in tangential alignment with the rotation of said subframe,
a single control cloumn universally mounted to extend perpendicularly from said main frame in a central position and movable towards any desired direction of translational movement of the main frame over the ground,
means to connect said column to said control means in a manner to operate the control means to predetermine the phase relation of the cyclical variation of the steering angle of each wheel relative to the rotation of said subframe in accordance with the direction of movement of said column from the central position with the amplitude of the steering angle variation of each wheel determined in accordance with the degree of movement of said column from the central position whereby the vehicle will translate over the ground in a direction determined by the phase relation of the variation of steering angle and with a speed determined by the amplitude of the steering angle variation of each wheel,
and means to prevent contra-rotation of said main frame relative to said subframe.

23. The invention of claim 22 in which said means to prevent contra-rotation of said main frame is comprised of
an auxiliary subframe pivotally mounted on said main frame for rotation about an axis generally perpendicular to the ground,
means to rotate said auxiliary subframe in synchronism with the rotation of said subframe,
said auxiliary subframe having at least one wheel pivotally connected thereto at a point radially spaced from its axis of rotation,
second steering means to determine the steering angle axis of rotation of each wheel on said auxiliary subframe,
and means interconnecting said control means and said second steering means to controllably and cyclically vary the steering angle of each wheel of the auxiliary subframe as the steering angle of each wheel of the subframe is varied.

24. An omnidirectional drive land vehicle comprising,
a main frame,
a subframe,
means to pivotally support said main frame on said subframe to permit relative rotation therebetween about an axis generally perpendicular to the ground,
at least one wheel pivotally connected to said subframe at a point radially spaced from the axis of rotation of said subframe,
means to rotate said subframe,
steering means to determine the steering angle axis of rotation of each wheel,
control means for said steering means responsive to the rotation of said subframe to cyclically vary the steering angle of each wheel from a position in which each wheel is in tangential alignment with the rotation of said subframe,
a single control column universally mounted to extend perpendicuarly from said main frame in a central position and movable towards any desired direction of translational movement of the main frame over the ground,
means to connect said column to said control means in a manner to operate the control means to predetermine the phase relation of the cyclical variation of the steering angle of each wheel relative to the rotation of said subframe in accordance with the direction of movement of said column from the central position with the amplitude of the steering angle variation of each wheel determined in accordance with the degree of movement of said column from the central position whereby the vehicle will translate over the ground in a direction determined by the phase relation of the variation of steering angle and with a speed determined by the amplitude of the steering angle variation of each wheel,
and means to prevent contra-rotation of said main frame relative to said subframe.

25. The invention of claim 24 in which said means to prevent contra-rotation of said main frame is comprised of
an auxiliary subframe pivotally mounted on said main frame for rotation about an axis generally perpendicular to the ground,
means to rotate said auxiliary subframe in synchronism with the rotation of said subframe,
said auxiliary subframe having at least one wheel pivotally connected thereto at a point radially spaced from its axis of rotation,
second steering means to determine the steering angle axis of rotation of each wheel on said auxiliary subframe,
and means interconnecting said control means and said second steering means to controllably and cyclically vary the steering angle of each wheel of the auxiliary subframe as the steering angle of each wheel of the subframe is varied.

26. An omnidirectional drive land vehicle comprising, a main frame, a subframe, means to pivotally support said main frame on said subframe to permit relative rotation therebetween about an axis generally perpendicular to the ground, at least one wheel pivotally connected to said subframe at a point radially spaced from the axis of rotation of said subframe, means to rotate said subframe, steering means to determine the steering angle axis of rotation of each wheel, control means for said steering means responsive to the rotation of said subframe to cyclically vary the steering angle of each wheel from a position in which each wheel is in tangential alignment with the rotation of said subframe, a single control column universally mounted to extend perpendicularly from said main frame in a central position and movable towards any desired direction of translational movement of the main frame over the ground, means to connect said column to said control means in a manner to operate the control means to predetermine the steering angle of each wheel to tangentially align each wheel with the rotation of said subframe when the column is in the normal position and to predetermine the phase relation of the cyclical variation of the steering angle of each wheel relative to the rotation of said subframe in accordance with the direction of movement of said column from the central position with the amplitude of the steering angle variation of each wheel determined in accordance with the degree of movement of said column from the central position whereby the vehicle will translate over the ground in a direction determined by the phase relation of the variation of steering angle and with a speed determined by the amplitude of the steering angle variation of each wheel, and means to head said main frame in the direction of its movement over the ground.

27. An omnidirectional drive land vehicle comprising, a main frame, a subframe, means to pivotally support said main frame on said subframe to permit relative rotation therebetween about an axis generally perpendicular to the ground, at least one wheel pivotally connected to said subframe at a point radially spaced from the axis of rotation of said subframe, means to rotate said subframe, steering means to determine the steering angle axis of rotation of each wheel, control means for said steering means to cyclically vary the steering angle of each wheel from a position in which each wheel is in tangental alignment with the rotation of said subframe, a single control column universally mounted to extend perpendicularly from said main frame in a central position and movable towards any desired direction of translational movement of the main frame over the ground, means to connect said column to said control means in a manner to operate the control means to predetermine the steering angle of each wheel to tangentially align each wheel with the rotation of said subframe when the column is in the normal position and to predetermine phase relation of the cyclical variation of the steering angle of each wheel relative to the rotation of said subframe in accordance with the direction of movement of said column from the central position with the amplitude of the steering angle variation of each wheel determined in accordance with the degree of movement of said column from the central position whereby the vehicle will translate over the ground in a direction determined by the phase relation of the variation of steering angle and with a speed determined by the amplitude of the steering angle variation of each wheel, and means to prevent contra-rotation of said main frame relative to said subframe.

28. An omnidirectional drive land vehicle comprising, a main frame, a subframe, means to pivotally support said main frame on said subframe to permit relative rotation therebetween about an axis generally perpendicular to the ground, at least one wheel pivotally connected to said subframe at a point radially spaced from the axis of rotation of said subframe, means to rotate said subframe, steering means to determine the steering angle axis of rotation of each wheel, control means for said steering means responsive to the rotation of said subframe to cyclically vary the steering angle of each wheel from a position in which each wheel is in tangential alignment with the rotation of said subframe, a single control column universally mounted to extend perpendicularly from said main frame in a central position and movable towards any desired direction of translational movement of the main frame over the ground, means to connect said column to said control means in a manner to operate the control means to predetermine the steering angle of each wheel to tangentially align each wheel with the rotation of said subframe when the column is in the normal position and to predetermine phase relation of the cyclical variation of the steering angle of each wheel relative to the rotation of said subframe in accordance with the direction of movement of said column from the central position with the amplitude of the steering angle variation of each wheel determined in accordance with the degree of movement of said column from the central position whereby the vehicle will translate over the ground in a direction determined by the phase relation of the variation of steering angle and with a speed determined by the amplitude of the steering angle variation of each wheel, and means to prevent contra-rotation of said main frame relative to said subframe.

No references cited.